United States Patent [19]

Wreesmann et al.

[11] Patent Number: 5,001,209

[45] Date of Patent: Mar. 19, 1991

[54] NON-LINEAR OPTICAL ACTIVE DIOLS AND POLYURETHANES PREPARED THEREFROM

[75] Inventors: Carel T. J. Wreesmann, Arnhem; Doetze J. Sikkema, Ellecom; Erwin W. P. Erdhuisen, Duiven, all of Netherlands

[73] Assignee: Akzo N.V., Arnhem, Netherlands

[21] Appl. No.: 373,368

[22] Filed: Jun. 29, 1989

[30] Foreign Application Priority Data

Jul. 4, 1988 [NL] Netherlands .................... 8801681

[51] Int. Cl.$^5$ .................... C08G 18/28; C08G 18/67
[52] U.S. Cl. .................... 528/70; 528/75; 528/76; 528/77; 528/78; 528/79; 528/80; 528/82; 528/85
[58] Field of Search .................... 528/75, 76, 70, 78, 528/79, 80, 82, 85, 77, 79

[56] References Cited

U.S. PATENT DOCUMENTS

| | | | |
|---|---|---|---|
| 4,717,757 | 1/1988 | Dubois et al. | 526/246 |
| 4,719,281 | 1/1988 | Choe | 528/75 |
| 4,757,130 | 7/1988 | De Martino | 528/288 |
| 4,954,288 | 9/1990 | Est | 528/425 |

FOREIGN PATENT DOCUMENTS

| | | |
|---|---|---|
| 0194747 | 7/1986 | European Pat. Off. |
| 0241338 | 3/1987 | European Pat. Off. |
| 3603267 | 2/1989 | Fed. Rep. of Germany |

OTHER PUBLICATIONS

ACS Symposium Series 233, American Chemical Society, Washington, D.C., 1983.

Angew. Chemie Int. Ed., 23 690 (1984).
J. I. Thackera et al., Appl. Phys. Lett. 52, 1031-33 (1988).
Katz et al., J. Am. Chem. Soc. 109 6561 (1987).
Oudar et al., J. Chem. Phys. 67 446 (1977).
K. Freudenberg & H. Hess, Liebigs Annalen der Chemie, vol. 448 (1926), p. 121.
A. Franke et al., Synthesis (1979), pp. 712-714.
D. H. Wadsworth et al., Journal of Organic Chemistry, vol. 30 (1965) p. 680 ff.
G. R. Möhlmann et al., 1989 Technical Digest Series, vol. 2 (Topical Meeting on Non-Linear Guided Wave Phenomena), Optical Society of America, Washington, D.C., 1989, pp. 171-174.
S. Esselin et al., Proc. SPIE's Symposium on Optical & Optoelectronic Applied Science & Engineering, San Diego (1988).
D. J. Williams, "NLO Properties of Organic Molecules & Crystals", vol. 1, pp. 427-429 (1987).
Chemical Abstracts 107:226082t.
A. C. Griffin, SPIE vol. 682, p. 65 (1986).

*Primary Examiner*—John Kight, III
*Assistant Examiner*—Rabon Sergent
*Attorney, Agent, or Firm*—David H. Vickrey; Louis A. Morris

[57] ABSTRACT

Polyurethanes having high hyperpolarizability densities and other favorable properties can be easily prepared from nonlinear optical active diols (NLO-diols) of a certain general formula, which have a delocalized $\pi$ electron system to which both an electron donor group and an electron acceptor group are coupled directly (D$\pi$A system). The polyurethanes may be used in optical waveguides.

5 Claims, No Drawings

NON-LINEAR OPTICAL ACTIVE DIOLS AND POLYURETHANES PREPARED THEREFROM

BACKGROUND OF THE INVENTION

The invention pertains to polyurethanes produced from certain non-linear optical active diols. Such diols display a molecular hyperpolarizability $\beta$ of the order of $10^{-38} m^4/V$. The phenomenon of molecular hyperpolarizability and the related non-linear optical (NLO) effects (Pockel's effect and second harmonic generation) are described in ACS Symposium Series 233, American Chemical Society, Washington, D.C., 1983, and in Angew. Chem. Society, 96 637-51 (1984).

Generally, hyperpolarizable molecules have a delocalized $\pi$ electron system to which both an electron donor group and an electron acceptor group are coupled directly (D$\pi$A system).

Polymers having hyperpolarizable side groups may be subjected to polar orientation in an electric field. As a result, the material also becomes macroscopically hyperpolarizable.

Such a material may be used in an optical switch, in which case an electric circuit is provided on a hyperpolarizable polymer. Such a use is described by J. I. Thackera et al., Appl. Phys. Lett. 52 1031-33 (1988).

The diols useful in the invention are of the formula:

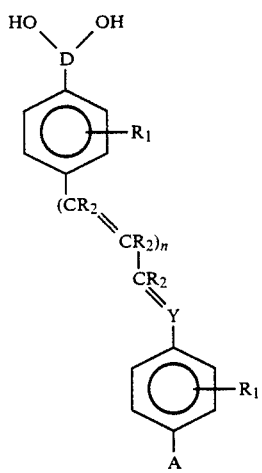

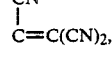

$A = CN, NO_2, CH=C(CN)_2,$
or $CF_3$; and
$n = 0-4$.

The groups $R_1$ at the two benzene rings are not necessarily identical. This also applies to the groups $R_2$ at the double bonds.

The polyurethanes of the current invention are obtained by reacting a D$\pi$A diol of the aforementioned type with a diisocyanate.

The essence of the diols useful in the invention is that they have a D$\pi$A system. The group at the benzene ring ($R_1$) is not of vital importance here. Only if there should be a fluorine substituent at the ring to which the acceptor A is also coupled may, on the strength of European Patent Specification No. 0 241 338, a real effect be expected on the macroscopic hyperpolarizability following the incorporation of the diol in a polymer. When selecting substituents at the double bond it should be kept in mind that the D$\pi$A system must not be forced out of planarity. If it is sterically forced out of planarity slightly by, for instance, a t-butyl group, then the hyperpolarizability may be influenced negatively.

SUMMARY OF THE INVENTION

A polyurethane comprised of the reaction product of a diisocyanate and at least one diol of the formula:

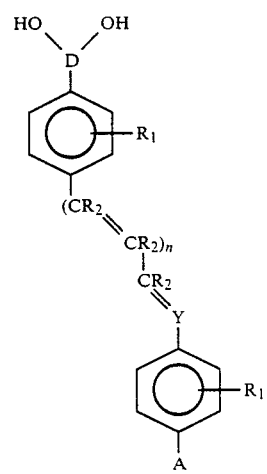

wherein D is a trivalent donor group having 2–10 aliphatic carbon atoms and containing at least one alkoxy-oxygen atom or a nitrogen atom forming a tertiary amine, the oxygen or nitrogen atom being linked directly to the benzene ring attached to said donor group, and wherein $R_1 =$ halogen, $R_2$, $OR_2$, $COR_2$, $COOR_2$, CN or $CF_3$;
$R_2 = H$ or an alkyl group having 1–3 carbon atoms;
$Y = CR_2$, C—CN, or N;
$A = CN, NO_2, CH=C(CN)_2,$

or $CF_3$; and
$n = 0-4$.

DETAILED DESCRIPTION OF THE INVENTION

The present invention is a polyurethane comprised of the reaction product of a diisocyanate and a diol of the formula:

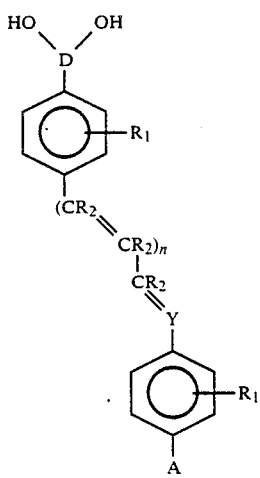

wherein D is a trivalent donor group having 2-10 aliphatic carbon atoms and containing at least one alkoxy-oxygen atom or a nitrogen atom forming a tertiary amine, the oxygen or nitrogen atom being linked directly to the benzene ring attached to said donor group, and wherein $R_1$ = halogen, $R_2$, $OR_2$, $COR_2$, $COOR_2$, CN or $CF_3$;
$R_2$ = H or an alkyl group having 1-3 carbon atoms;
Y = $CR_2$, C—CN, or N;

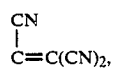

A = CN, $NO_2$, CH=C(CN)$_2$, or $CF_3$; and
n = 0-4.

The polyurethanes according to the invention can be easily formed into a thin smooth film, for example, by spin or dip coating techniques. A further advantage to the polyurethanes according to the invention with respect to their use as a non-linear optical active material is that they exhibit a very slight attenuation of the optical signal in the wavelength region used, the near infrared region.

An additional advantage of some polyurethanes is their good resistance to some much-used solvents. If the diisocyanate chosen is isophorone diisocyanate (IPDI), methylene di (p-phenylene isocyanate) (MDI), methylene di(cyclohexylene-4-isocyanate) ($H_{12}$-MDI), or toluene diisocyanate (TDI), the resulting polymers do not dissolve in xylene, ethyl acetate, or ethanol. As a result, these solvents may be used in spin or dip coating a stack of several successive layers of the above polyurethanes, so that an NLO-active waveguide may be prepared as described in the publication by Thackara et al. referred to above. Both core and cladding of the waveguide are optical active then. It should be noted that a diol which is structurally related to the diols according to the invention is known from EP 0 194 747, which publication, however, does not relate either to polyurethanes or to NLO applications. This diol is of the formula:

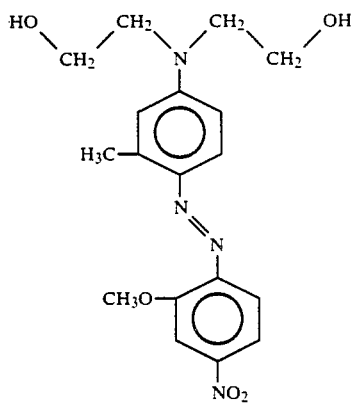

The above diol serves as a chromophoric moiety and is polycondensed into a polymeric azo dye. Although this moiety is a D$\pi$A system, such a diol is less suited to be used as an NLO-active hyperpolarizable group than the diols according to the invention, since the molecular hyperpolarizability is relatively low.

A proper comparison between the molecular hyperpolarizability values of two different groups of molecules is best made by considering the $\beta_o$ value. This is described by Katz et al. in J. Am. Chem. Soc. 109 6561 (1987). The $\beta_o$ value indicates the molecular hyperpolarizability extrapolated to a frequency of zero. For the 1-(4-N,N-dialkylamino-phenylazo)-4-nitrobenzene group, a group according to EP 0 194 747, a $\beta_o$ value of $47 \times 10^{-3}$ esu is given, which in the SI system corresponds to $1.95 \times 10^{-38} m^4/V$. On the basis of data published by Oudar et al. (J. Chem. Phys. 67 446 (1977)) the $\beta_o$ for a 4-N,N-dialkylamino-4'-nitrostilbene group, a hyperpolarizable group as found in diols according to the invention, may be calculated in accordance with the method of Katz et al. This $\beta_o$ is found to be about $5.9 \cdot 10^{-38} m^4/V$. So, the latter diol has a $\beta_o$ which is about three times as high as the $\beta_o$ of the diol according to EP 0 194 747, so that it is evidently more suitable to be used as a hyperpolarizable group in polymers for NLO applications.

Of course, the diols useful in the invention may also be used to obtain NLO-active polyurethanes by reaction with mixtures of diisocyanates. Also, these mixtures may in part contain polyfunctional isocyanates so as to give a certain degree of branching, with the polymer still remaining processable. Alternatively, it is possible in polyurethane formation to make use of mixtures of diols according to the invention, optionally mixed with non-NLO-active diols or polyols. Preferably, in that case the percentage of diols according to the invention which is built into the polyurethane is high enough to guarantee a hyperpolarizability density of at least $10^{-11} m^4/V$. By hyperpolarizability density is meant according to the invention the product of the number of hyperpolarizable groups per unit of volume and the molecular hyperpolarizability $\beta_o$ of these groups.

Synthetic accessibility and degree of molecular hyperpolarizability together are determinative of which diols according to the invention are to be preferred. They are diols of the above-mentioned formula, wherein A = $NO_2$,
$R_1$ = H,
Y = CH, and

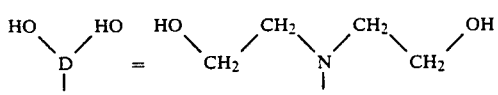

For the above-mentioned reasons the following di(2-hydroxyethyl)amino group is the most preferred $D(OH)_2$ group. Also highly suitable are groups of the formula

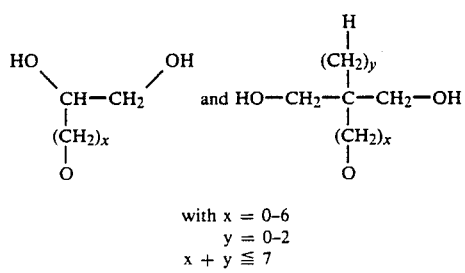

with $x = 0-6$
$y = 0-2$
$x + y \leq 7$

The invention will be further described in but not limited by the following examples.

EXAMPLE 1

Preparation of 4-(2,3-dihydroxypropyloxy)-4′-nitrostilbene a. 4-hydroxy-4′-nitrostilbene A mixture of 181 g of 4-nitrophenyl acetic acid, 122 g of 4-hydroxybenzaldehyde, 0.8 l of mesitylene and 0.2 l of piperidine was stirred for 90 minutes at 120° C. under an atmosphere of nitrogen. After cooling to 60° C. the reaction mixture was poured into a mixture of 1 l of 2N HCl and 1 l of petroleum ether (boiling point 80°–110° C). Following filtration and washing with 2 l of water the crude product was dried and then crystallized from 2 l of ethanol (100%). Obtained were 190 g of 4-hydroxy-4′-nitrostilbene having a melting point of 209° C.

b. 4-((2,2-dimethyl-1,3-dioxa-4-cyclopentyl)methyl)-4′-nitrostilbene

A mixture of 120.5 g of 4-hydroxy-4′-nitrostilbene, 69 g of anhydrous potassium carbonate, 143 g of 2,2-dimethyl-4-(4-methyl phenyl sulphonyloxymethyl)-1,3-dioxolane, prepared in accordance with the specification of K. Freudenberg and H. Hess in Liebigs Annalen der Chemie Vol. 448 (1926), p. 121, and 1 l of dimethyl formamide (DMF) was boiled for 30 minutes with refluxing. After cooling the reaction mixture was poured, with vigorous stirring, into 5 l of water. The precipitated crystals were filtered off and after-washed with 5 l of water. The crude product after drying was crystallized from 4 l of acetone. Obtained were 135 g of 4-((2,2-dimethyl-1,3-dioxa-4- cyclopentyl)methyl)-4′-nitrostilbene in the form of yellow acicular crystals having a melting point of 146°–147° C.

c. 4-(2,3-dihydroxypropyloxy)-4′-nitrostilbene

A solution of 135 g of 4-((2,2-dimethyl-1,3-dioxa-4-cyclopentyl)methyl)-4′-nitrostilbene, 15 g of paratoluene sulphonic acid monohydrate in 1 l of tetrahydrofuran (THF) and 100 ml of water was boiled with refluxing for 5 hours. After cooling the reaction mixture was neutralized with 10 ml of triethylamine. The resulting clear solution was concentrated by evaporation to a volume of about 0.5 l and subsequently poured, with vigorous stirring, into 5 l of water. The resulting precipitate was filtered off and after-washed with 5 l of water. The crude product after drying was crystallized from a mixture of 2 l of acetone and 0.5 l of n-hexane. Obtained were 105 g of 4-(2,3-dihydroxypropyloxy)-4′-nitrostilbene having a melting point of 147° C. and a clearing temperature of 152° C.

EXAMPLE 2

Preparation of 4-di-(2-hydroxyethyl)amino-4′-nitrostilbene a. N,N-(2-acetyloxyethyl)aniline A mixture of 181 g of N,N-di(2-hydroxyethyl)aniline and 250 ml of acetic anhydride was boiled with refluxing for 45 minutes. Next, the volatile constituents (acetic acid and acetic anhydride) were evaporated. The residue (about 290 g of brown oil), which consisted almost entirely of N,N-di(2-acetyloxyethyl)aniline, was used in the next step without further purification.

b. 4-di(2-acetyloxyethyl)aminobenzaldehyde

To 450 ml of dry dimethyl formamide were slowly added dropwise with stirring and at a temperature of 0°–10° C. 100 ml of freshly distilled phosphoroxytrichloride. This mixture was stirred for 2 hours at 20° C. To this mixture there was subsequently added dropwise with proper stirring and over a period of 60 minutes the crude reaction product of the previous step, viz. N,N-di(2-acetyloxyethyl)aniline, the reaction mixture being kept at a temperature of 20° C. Next, the reaction mixture was heated to 60° C. for 60 minutes and then poured, with vigorous stirring, into a mixture of 1 kg of ice and a solution of 525 g of sodium acetate trihydrate in 1 l of water. The organic layer was separated and the water layer was extracted four times, each time with 300 ml of dichloromethane. The combined organic layers were washed three times, each time with 200 ml of water, dried on magnesium sulphate, and concentrated by evaporation. The residue (about 280 g of dark brown oil), which consisted almost entirely of 4-di(2-acetyloxyethyl)aminobenzaldehyde, was used in the next step without further purification.

c. 4-di(2-hydroxyethyl)amino-4′-nitrostilbene

A mixture of the crude reaction product of the previous step, viz. 4-di(2-acetyloxyethyl)aminobenzaldehyde, 270 g of 4-nitrophenyl acetic acid, 2 l of dimethyl formamide, and 100 ml of piperdine was stirred for 4 days at 20°–25° C. Next, the reaction mixture was concentrated by evaporation at 70° C. to a thick red oil, which was titrated three times, each time with 1 l of n-hexane. The residue was dissolved in 2.5 l of dimethyl formamide. Then there was added a solution of 320 g of sodium hydroxide in 800 ml of water. The resulting reaction mixture was then heated for 16 hours to 100° C. and subsequently poured into 10 l of ice water. The precipitated product was filtered off and thoroughly after-washed three times, each time with 1 l of water. After drying the crude reaction product was crystallized from 250 ml of dimethyl formamide and 500 ml of dichloromethane. The resulting yield of 4-di(2-hydroxy-ethyl) amino-4′-nitrostilbene was 190 g with a melting point of 184°–185° C. Calculated on N,N-di(2-hydroxyethyl)aniline this is 58% of theory.

EXAMPLE 3

Preparation of N,N-di-(2-hydroxyethyl)-4-nitroaniline

A mixture of 70.5 g of 1-fluoro-4-nitrobenzene and 250 ml of diethanolamine was heated for 1 hour at 160° C. After cooling to about 50° C. the reaction mixture was poured, with vigorous stirring, into 2 l of water. The precipitated product was filtered off, dried and crystallized from a mixture of 400ml of dichloromethane and 200 ml of methanol. Obtained were in all 90 g of N,N-di-(2-hydroxyethyl)-4-nitroaniline with a melting point of 102°–104° C.

EXAMPLE 4

Preparation of 4-di-(2-hydroxyethyl)amino-4'-cyanostilbene a. 4-di(2-hydroxyethyl)aminobenzaldehyde

To a solution of 293 g of 4-di-(2-acetoxyethyl) aminobenzaldehyde (see under Example 2b) in 500 ml of dimethyl formamide was added a solution of 54 g of sodium methanolate in 500 ml of methanol. After stirring for 30 minutes at room temperature the reaction mixture was neutralized with acetic acid and concentrated to a small volume. The residue was taken up in 500 ml of water and 500 ml of ethyl acetate. The water layer was separated and extracted six times, each time with a portion of 500 ml of ethyl acetate. The combined organic layers were dried on magnesium sulphate and evaporated. The residue was crystallized from 500 ml of ethyl acetate to yield 156 g of 4-di(2-hydroxyethyl)aminobenzaldehyde with a melting point of 63°–64° C.

b. 4-di-(2-tert.butyl dimethyl silyloxyethyl)aminobenzaldehyde

A solution of 104.5 g of 4-di(2-hydroxyethyl) aminobenzaldehyde, 158.2 g of tert.butyl dimethyl silyl chloride and 81.6 g of imidazole in 500 ml of dimethyl formamide was stirred for 15 minutes at 40° C. The reaction mixture was then poured, with vigorous stirring, into 1 l of water and 500 ml of ether. The organic layer was extracted twice, each time with a portion of 250 ml of ether. The combined organic layers were then washed with 500 ml of 10%-aqueous sodium bicarbonate and 500 ml of water, dried on magnesium sulphate, and evaporated to yield 220 g of 4-di-(2-tert.butyl dimethyl silyloxyethyl) aminobenzaldehyde in the form of a colorless oil that did not crystallize.

c. 4-di-(2-hydroxyethyl)amino-4'-cyanostilbene

To a solution of 44 g of 4-di-(2-tert.butyl dimethyl silyloxyethyl)-aminobenzaldehyde in 200 ml of dimethyl formamide were added 25.3 g of diethyl 4-cyanophenyl phosphonate, prepared as prescribed by A. Franke et al. in Synthesis (1979), p. 712–714, and, in small portions, 5 g of sodium hydride, 60%-dispersion in mineral oil. The reaction mixture was stirred for 1 hour at room temperature and subsequently neutralized with diluted acetic acid. The resulting mixture was concentrated to a small volume, taken up in 500 ml of dichloromethane and washed with a 10%-aqueous solution of sodium bicarbonate and water. The organic layer was separated, dried on magnesium sulphate and evaporated. The crude product, consisting of 48 g of almost pure 4-di-(2-tert.butyl dimethyl silyloxyethyl)amino-4'-cyanostilbene was added to a mixture of 200 ml of tetrahydrofuran, 20 ml of water, and 5 ml of concentrated hydrochloric acid. The resulting mixture was boiled with refluxing for 2 hours. After cooling it was neutralized with triethyl amine, concentrated to a small volume and poured, with vigorous stirring, into 1 l of water. The precipitated product was filtered off, washed with 1 l of water, dried in vacuo and crystallized from a mixture of 100 ml of dimethyl formamide and 100 ml of ethanol. The yield of pure 4-di-(2-hydroxyethyl) amino-4'-cyanostilbene was 19 g; melting point: 197° C.

EXAMPLE 5

Preparation of 1-(4-di(2-hydroxyethyl)aminophenyl)-4-(4-nitrophenyl)-1,3-butadiene a. N,N-di(2-acetoxyethyl)aniline

A mixture of 9 g of N,N-di(2-hydroxyethyl)aniline and 12.5 ml of acetic anhydride was boiled for 45 minutes with refluxing. Next, the volatile constituents (acetic acid and acetic anhydride) were evaporated. The residue was coevaporated with toluene and subsequently concentrated by evaporation to a brown oil (about 14.5 g), which consisted almost entirely of N,N-di(2-acetoxyethyl)aniline and was used in the next step without further purification.

b. 4-di(2-acetoxyethyl)amino cinnamaldehyde

To a solution of 5 ml of freshly distilled N,N-dimethyl amino-acrolein in 40 ml of dichloromethane was added dropwise with continuous stirring and at a temperature of 0° C. a solution of 5 ml of phosphoroxytrichloride in 10 ml of dichloromethane. The resulting clear solution was stirred for 30 minutes at room temperature, followed by adding to it dropwise over a period of 30 minutes a solution of the crude reaction product of the previous step, viz. about 14.5 g of N,N-di(2-acetoxyethyl) aniline in 10 ml of dichloromethane. The, reaction mixture was stirred at room temperature for 72 hours and subsequently poured, with vigorous stirring, into a solution of 27 g of sodium acetate trihydrate in 200 ml of water. The organic layer was separated, washed with a saturated sodium bicarbonate solution, dried on magnesium sulphate, and then concentrated by evaporation to a brown oil. The crude product was purified by silica gel column chromatography (200 g of silica gel from Merck in West-Germany, article no. 7734, the eluant used being a mixture of dichloromethane and methanol in a volume ratio of 95:5). Concentration by evaporation of the proper fractions resulted in obtaining about 5 g of slightly impurified N,N-di-(2-acetoxyethyl)amino cinnamaldehyde, which were used in the next step without further purification.

c. 1-(4-di(2-acetoxyethyl)aminophenyl)-4-(4-nitrophenyl)-1,3-butadiene

To a solution of the crude reaction product of the previous step, viz. about 5 g of 4-di(2-acetoxyethyl)amino cinnamaldehyde in 125 ml of dimethyl formamide (DMF) were added 6 g of diethyl-4-nitro-benzyl phosphonate, prepared as prescribed by D. H. Wadsworth et al. in the Journal of Organic Chemistry, Vol. 30 (1965), p. 680 ff and, in small successive portions, 1.2 g of sodium hydride in the form of a 60%-dispersion in mineral oil, supplied by Jansses Chimica of Beerse, Belgium. The reaction mixture was stirred for 1 hour at room temperature and then poured, with vigorous stirring at 0° C., into a mixture of 400 ml of dichloromethane, 200 ml of water, and 20 ml of acetic acid. The organic layer was separated, washed twice with a saturated solution of sodium chloride, dried on magnesium sulphate, and concentrated by evaporation to a small volume. The residue was dissolved in 125 ml of dimethyl formamide (DMF), to which was added a solution of 8 g of sodium hydroxide in 25 ml of water. The resulting clear solution was boiled for 30 minutes with refluxing and then poured, with vigorous stirring, into 500 ml of water. The resulting precipitate was filtered off and after-washed with water until the filtrate had a pH of 7. The crude product after drying was crystallized from a mixture of 25 ml of dimethyl formamide (DMF) and 75 ml of dichloromethane. Obtained were 4.0 g of pure 1-(4-di-hydroxyethyl)aminophenyl)-4-(4-nitrophenyl)-1,3 butadiene having a melting point of 195°–198° C.

EXAMPLE 6

Preparation of 1-(4-di-(2-hydroxyethyl)aminophenyl)-6-(4-nitrophenyl)-hexa-1,3,5-triene a. 5-(4-di-(2-tert.butyl dimethyl silyloxyethyl)aminophenyl) penta-2.4-dienal The title compound was prepared following the same procedure as described in Example 4a. Making use of 23 g of para-di-(2-tert.butyl dimethyl silyloxyethyl)amino cinnamaldehyde about 18 g of 5-(4-di-(2-tert.butyl dimethyl silyloxyethyl)aminophenyl)penta-2,4-dienal were obtained in the form of a red solid.

b. 1-(4-di-(2-tert.butyl dimethyl silyloxyethyl)aminophenyl)-6-(4-nitrophenyl)-hexa-1,3,5-triene The title compound was prepared following the same procedure as described in Example 4b. Making use of 18 g of 5(di-(2-tert.butyl dimethyl silyloxyethyl)aminophenyl)penta-2,4-dienal 19 g of 1-(4-di-(2-tert.butyl dimethyl silyloxyethyl) amino phenyl)-6-(4-nitrophenyl)-hexa-1,3,5-triene were obtained with a melting point of 146°–150° C.

c. 1-(4-di(2-hydroxyethyl)aminophenyl-6-(4-nitrophenyl)-hexa-1.3.5-triene

The title compound was prepared following the same procedure as described in Example 4c. Making use of 19 g of 1-(4-di-(2-tert.butyl dimethyl silyloxyethyl)aminophenyl)-6-(4-nitrophenyl)-hexa-1,3,5-triene 19 g of 1-(4-di-(2-hydroxyethyl)aminophenyl)-6(4-nitrophenyl)-hexa-1,3,5-triene were obtained with melting point of 220° C. (dec.).

EXAMPLE 7

Preparation of 1-(4-di(2-hydroxyethyl)aminophenyl-8-(4-nitrophenyl)octa-1,3,5,7-tetraene a. 7-(4-di(2-tert.butyl dimethyl silyloxyethyl)aminophenyl)hepta-2,4,6-trienal The title compound was prepared following the same procedure as described in Example 4a. Making use of 10 g of 5-(di-(2-tert.butyl dimethyl silyloxyethyl)amino 8.2 g of 7-(4-di-(2-tert.butyl dimethylsilyloxyethyl)aminophenyl)-hepta-2,4,6-trienal were obtained in the form of a purple solid.

b. 1-(4-di(2-tert.butyl dimethyl silyloxyethyl)aminophenyl)-8-(4-nitrophenyl)-octa-1,3,5,7-tetraene The title compound was prepared following the same procedure as described in Example 4b. Making use of 8.2 g of 7-(di-(2-tert.butyl dimethyl silyloxyethyl)aminophenyl)penta-2,4-dienal 8.9 g of 1-(4-di-(2-tert.butyl dimethyl silyloxyethyl)aminophenyl)-8-(4-nitrophenyl)-octa-1,3,5,7-tetraene were obtained with a melting point of 168°–171° C.

c. 1-(4-di-(2-hydroxyethyl)aminophenyl)-8-(4-nitrophenyl)-octa-1,3,5-tetraene

The title compound was prepared following the same procedure as described in Example 4c. Making use of 8.9 g of 1-(4-di-(2-tert.butyl dimethyl silyloxyethyl)aminophenyl)-8-4-nitrophenyl)-octa-1,3,5,7-tetraene 4.4 g of 1-(4-di-(2-hydroxyethyl)aminophenyl)-8-(4-nitrophenyl)-octa-1,3,5,7-tetraene were obtained with a melting point of 245° C. (dec.).

EXAMPLE 8

General preparation of NLO-polyurethanes

A solution of 100 ml of monomeric diol (see Examples 1 to 7), 100 mmoles of diisocyanate and a drop of di-n-butyl tin diacetate in 300 ml dimethyl formamide was heated for 1 hour at 60° C. After cooling to room temperature the reaction mixture was poured, with vigorous stirring, into 2 l of ethanol. The precipitated product was filtered off, washed with 1 l of ethanol, and dried in vacuo at 50° C. The yields were almost quantitative.

EXAMPLE 9

Preparation of an NLO-polyurethane from a polyurethane prepolymer a. Polyurethane prepolymer Following the same procedure as described in Example 8, a polyurethane prepolymer was prepared from 4-di(2-hydroxyethyl)-aminobenzaldehyde (see Example 4a) and isophorone diisocyanate the yield of which was quantitative.

b. NLO-polyurethane

A solution of 4.3 g of the polyurethane prepolymer described in Example 9a, 3.3 g of nitrobenzyl bromide and 0.2 ml of piperidine in 25 ml of dimethyl formamide was heated for 1 hour at 120° C. After cooling the volatile components were evaporated. The residue was taken up in 50 ml of dichloromethane and the resulting solution was poured, with vigorous stirring, into 500 ml of ethanol. The precipitated product was filtered off, washed with ethanol and dried in vacuo at 50° C. Obtained were 5.7 g of NLO-polyurethane in the form of an orangish-brown powder.

TABLE 1

| Data on NLO Polyurethanes | | | | |
|---|---|---|---|---|
| Monomers | | | | $D_{hyp}^{(c)}$ in |
| Diol from Example No. | Diisocyanate | $M_w^{(a)}$ | Tg (in °C.) | $10^{-11} \frac{m}{V}$ |
| 1 | IPDI | 4000 | 130 | 2.15 |
| 1 | $H_{12}$—MDI | 8000 | 130 | 2.0 |
| 1 | MDI | 8000 | 140 | 2.05 |
| 2 | IPDI | 10000 | 130 | 7.7 |
| 2 | $H_{12}$—MDI | 11000 | 130 | 7.2 |

TABLE 1-continued

Data on NLO Polyurethanes

| Monomers | | | | Dhyp(c) in |
|---|---|---|---|---|
| Diol from Example No. | Diisocyanate | $M_w^{(a)}$ | Tg (in °C.) | $10^{-11} \frac{m}{V}$ |
| 2 | TDI | 4000 | 130 | 8.7 |
| 2 | MDI | 8000 | 140 | 7.3 |
| 2 | THMDI(d) | 8000 | 75 | 7.9 |
| 3 | IPDI | 14000 | 119 | 0.8 |
| 4 | IPDI | 13000 | 139 | 1.6 |
| 5 | IPDI | 15000 | 142 | (b) |
| 6 | IPDI | 8000 | 148 | (b) |
| 7 | IPDI | 3000 | 156 | (b) |

(a)The $M_w$ was determined by gel permeation chromatography, the calibration curve being plotted using a series of polystyrene standard samples of a known molecular weight.
(b)Not determined.
(c)Hyperpolarizability density.
(d)2,2,4-trimethyl hexamethylene diisocyanate.

The hyperpolarizability density is defined as follows:

$$Dhyp = \frac{\rho N_A}{M} \cdot \beta_o$$

$\rho$: Density, for which a value of $1.2 \times 10^6$ gm$^{-3}$ is taken $N_A$: Avogadro's number ($6 \times 10^{23}$ mol.$^{-1}$)

M: Molecular weight of the recurring unit in g mol.$^{-1}$ $\beta_o$: Molecular hyperpolarizability extrapolated to a frequency of zero in accordance with the publication by Katz et al. referred to above.

The NLO group from Example 1 has a $\beta_o$ value of $1.6 \times 10^{-3} m^4 V^{-1}$ determined by the DC-SHG method described in the publication by Oudar et al. referred to above. The NLO group from Example 2 has a $\beta_o$ value of $5.9 \times 10^{-38} m^4 V^{-1}$. The NLO group from Example 3 has a $\beta_o$ value of $1.2 \times 10^{-28} m^4 V^{-1}$ and the NLO group from Example 4 has a $\beta_o$ value of $0.5 \times 10^{-38} m^4 V^{-1}$. The $\beta_o$ values of the NLO group from Examples 5, 6 and 7 have not been determined. Since these groups have more extended conjugated $\pi$ electron systems, their $\beta_o$ value will at any rate be higher than the $\beta_o$ value of the NLO group from Example 2.

The application of the polyurethane prepared from the diol of Example 2 and IPDI in a guided wave electro-optic device has been described by G. R. Möhlmann et al. in 1989 Technical Digest Series, Vol. 2 (Topical Meeting on Non-linear Guided Wave Phenomena), Optical Society of America, Washington, D.C., 1989 pp. 171-174. Said polyurethane (called "Akzo-DANS-polymer" in the above publication) was reported to have an r33 value of 28 pm/V. The electro-optic r33 coefficient is defined by D. J. Williams in "NLO Properties of Organic Molecules and Crystals", Vol. 1, pg. 427-429 (1987) and is directly proportional to the field induced change in index of refraction.

We claim:

1. A polyurethane comprised of the reaction product of a diisocyanate and at least one diol of the formula:

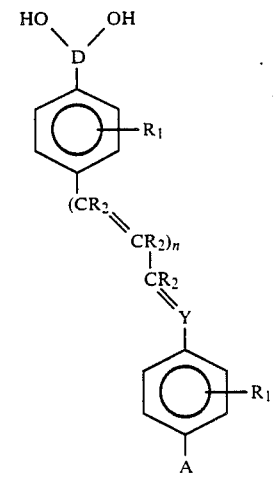

wherein D is a trivalent donor group having 2-10 aliphatic carbon atoms and containing at least one alkoxy-oxygen atom or a nitrogen atom forming a tertiary amine, the oxygen or nitrogen atom being linked directly to the benzene ring attached to said donor group, and wherein $R_1$ = halogen, $R_2$, $OR_2$, $COR_2$, $COOR_2$, CN or $CF_3$;
$R_2$ = H or an alkyl group having 1-3 carbon atoms;
Y = $CR_2$, C—CN, or N;

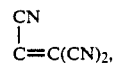

A = CN, $NO_2$, CH=C(CN)$_2$, or $CF_3$; and
n = 0-4.

2. A polyurethane of claim 1, wherein said diol group

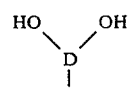

is of the following formula:

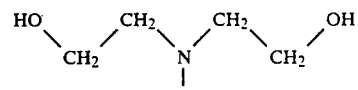

wherein $R_1$ = H, Y = CH, and A = $NO_2$.

3. A polyurethane of claim 1, wherein the diisocyanate is isophorone diisocyanate, methylene di(p-phenylene isocyanate), or methylene di(cyclohexylene-4-isocyanate).

4. A polyurethane of claim 2, wherein the diisocyanate is isophorone diisocyanate, methylene di(p-phenylene isocyanate), or methylene di(cyclohexylene-4-isocyanate).

5. A polyurethane of claim 1 wherein said at least one diol is a mixture of diols.

* * * * *